(12) United States Patent
Bagchi et al.

(10) Patent No.: US 10,108,904 B2
(45) Date of Patent: *Oct. 23, 2018

(54) COMBINING DIFFERENT TYPE COERCION COMPONENTS FOR DEFERRED TYPE EVALUATION

(71) Applicant: International Business Machines Corporation, Armonk, NY (US)

(72) Inventors: Sugato Bagchi, White Plains, NY (US); James J. Fan, Mountain Lakes, NJ (US); David A. Ferrucci, Yorktown Heights, NY (US); Aditya A. Kalyanpur, Westwood, NJ (US); James W. Murdock, IV, Millwood, NY (US); Christopher A. Welty, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 14/959,069

(22) Filed: Dec. 4, 2015

(65) Prior Publication Data

US 2016/0086503 A1   Mar. 24, 2016

Related U.S. Application Data

(63) Continuation of application No. 13/835,411, filed on Mar. 15, 2013, now Pat. No. 9,262,938.

(51) Int. Cl.
*G06N 5/00* (2006.01)
*G09B 7/02* (2006.01)

(52) U.S. Cl.
CPC ................. *G06N 5/00* (2013.01); *G09B 7/02* (2013.01)

(58) Field of Classification Search
CPC ................................ G06N 99/00; G06N 5/00
See application file for complete search history.

(56) References Cited

U.S. PATENT DOCUMENTS 5,237,502 A   8/1993   White et al.
6,487,545 B1  11/2002   Wical
(Continued)

OTHER PUBLICATIONS

Aditya Kalyanpur et al., "Leveraging Community-built Knowledge for Type Coercion in Question Answering", pp. 1-16, Jan. 16, 2013.
(Continued)

*Primary Examiner* — Vincent Gonzales
(74) *Attorney, Agent, or Firm* — Gibb & Riley, LLC

(57) ABSTRACT

In a method of answering questions, a question is received, a question LAT is determined, and a candidate answer to the question is identified. Preliminary types for the candidate answer are determined using first components to produce the preliminary types. Each of the first components produces a preliminary type using different methods. A first type-score representing a degree of match between the preliminary type and the question LAT is produced. Each preliminary type and each first type-score is evaluated using second components. Each of the second components produces a second score based on a combination of the first type-score and a measure of degree that the preliminary type matches the question LAT. The second components use different methods to produce the second score. A final score representing a degree of confidence that the candidate answer matches the question LAT is calculated based on the second score.

20 Claims, 11 Drawing Sheets

(56) References Cited

U.S. PATENT DOCUMENTS

| | | |
|---|---|---|
| 6,785,684 B2 | 8/2004 | Adbo |
| 6,829,603 B1 | 12/2004 | Chai et al. |
| 6,947,885 B2 | 9/2005 | Bangalore et al. |
| 6,983,252 B2 | 1/2006 | Matheson et al. |
| 7,069,267 B2 | 6/2006 | Spencer, Jr. |
| 7,136,909 B2 | 11/2006 | Balasuriya |
| 7,139,752 B2 | 11/2006 | Broder et al. |
| 7,216,073 B2 | 5/2007 | Lavi et al. |
| 7,236,968 B2 | 6/2007 | Seki et al. |
| 7,293,015 B2 | 11/2007 | Zhou |
| 7,295,981 B1 | 11/2007 | Gupta et al. |
| 7,299,228 B2 | 11/2007 | Cao et al. |
| 7,313,515 B2 | 12/2007 | Crouch et al. |
| 8,275,803 B2 | 9/2012 | Brown et al. |
| 8,301,438 B2 | 10/2012 | Ferrucci et al. |
| 8,332,394 B2 | 12/2012 | Fan et al. |
| 2002/0165884 A1 | 11/2002 | Kreulen et al. |
| 2007/0196804 A1 | 8/2007 | Yoshimura et al. |
| 2007/0203863 A1 | 8/2007 | Gupta et al. |
| 2009/0292687 A1 | 11/2009 | Fan et al. |
| 2011/0078192 A1 | 3/2011 | Murdock, IV |
| 2012/0077178 A1 | 3/2012 | Bagchi et al. |
| 2012/0078873 A1 | 3/2012 | Ferrucci et al. |
| 2012/0078890 A1 | 3/2012 | Fan et al. |
| 2012/0078902 A1 | 3/2012 | Duboue et al. |
| 2012/0330934 A1 | 12/2012 | Duboue et al. |

OTHER PUBLICATIONS

James Fan et al., "Mining Knowledge from Large Corpora for Type Coercion in Question Answering", pp. 1-17, Jan. 16, 2013.

J. William Murdock et al., "Statistical Approaches to Question Answering" in Watson, IBM TJ Watson Research Center, pp. 1-8, Jan. 16, 2013.

Markus Egg, "Type Coercion from a Natural Language Generation Point of View", pp. 1-18, Jan. 16, 2013.

Jerry Hobbs, "The Generic Information Extraction System", Artificial Intelligence Center, SRI International Menlo Park, CA 94025, pp. 1-6, Feb. 19, 2013, http://www.isi.edu/.about.hobbs/muc5-generic-final.pdf.

Kalina Bontcheva et al., "Shallow Methods for Named Entity Coreference Resolution", http://gate.ac.uk/sale/taln02/taln-ws-coref.pdf), TALN 2002, Nancy, Jun. 24-27, 2002, pp. 1-9.

Gosse Bouma et al.. "Reasoning over Dependency Relations for QA". KRAQ 05-IJCAI Workshop. Jul. 30, 2005, pp. 15-20.

D.C. Gondek et al., "A Framework for merging and ranking of answers in DeepQA", IBM J. Res. & Dev. vol. 56, No. 3/4 Paper 14, May/Jul. 2012, pp. 14:1-14:12.

JW. Murdock et al., "Typing candidate answers using type coercion", IBM J. Res. & Dev. vol. 56, No. 3/4, Paper 7, May/Jul. 2012. pp. 7:1-7:14.

Chris Welty et al., A Comparison of Hard Filters and Soft Evidence for Answer Typing in Watson, Berline: Springer, 2012, pp. 1-14.

W. Chu and Q. Chen, "A Structured Approach for Cooperative Query Answering", IEEE Transactions on Knowledge and Data Engineering, vol. 6, No. 5, Oct. 1994, pp. 738-749.

M. Umamehaswari et al., "Improved Question Answering System by Semantic Reformulation", IEEE Proc. 4th International Conference on Advanced Computing, Dec. 13-15, 2012, 4 pages.

U.S. Appl. No. 13/835,411, Office Action Communication dated Jun. 10, 2015, pp. 1-9.

U.S. Appl. No. 13/835,411, Notice of Allowance dated Oct. 13, 2015, pp. 1-5.

COMBINING DIFFERENT TYPE COERCION COMPONENTS FOR DEFERRED TYPE EVALUATION

CROSS REFERENCE TO RELATED APPLICATIONS

This application is a Continuation of U.S. application Ser. No. 13/835,411 filed Mar. 15, 2013, now U.S. Pat. No. 9,262,938, issued Feb. 16, 2016, the teachings of which are incorporated herein by reference, in their entirety.

BACKGROUND

The present disclosure relates to question answering (QA) systems, and more specifically, to determining if a candidate answer is of an appropriate lexical answer type.

The concept of deferred type evaluation is explained in U.S. patent application Ser. No. 12/126,642 entitled, "System and Method for Providing Question and Answers with Deferred Type Evaluation," filed May 23, 2008, published as U.S. Patent Application Publication No. US 2009/0292687 A1, and issued as U.S. Pat. No. 8,332,394 B2, the contents of which are incorporated herein by reference.

The concept of deferred type evaluation was further discussed in U.S. patent application Ser. No. 13/239,165 entitled, "Providing Question and Answers with Deferred Type Evaluation Using Text with Limited Structure," filed Sep. 21, 2011, published as U.S. Patent Application Publication No. US 2012/0078902 A1, and issued as U.S. Pat. No. 9,798,800 B2, the contents of which are incorporated herein by reference.

SUMMARY

The systems and methods herein address the coverage problem from individual type coercion components. Currently, there is a variety of ways to determine if a candidate answer is of a lexical answer type (LAT). All of these solutions rely on a particular set of resources and a particular set of algorithms. Since each type coercion component has its own limitations and biases, the coverage of type coercion in general can be improved.

Systems and methods herein combine the intermediate outputs of different type coercion components to produce a new type coercion output that has improved coverage than the other type coercion components, individually.

The present disclosure leverages the concept of LATs. The LATs are computed from a natural language analysis of the query and provide a description of an answer rather than its ontological category. A LAT of the question/query is the descriptor of the referent or referents of the entity that is a valid answer to the question.

According to a method herein, a question is received into a computerized device. A question LAT is determined, using the computerized device. The question LAT is a lexical answer type associated with the question. A candidate answer to the question is identified, using the computerized device. Preliminary types for the candidate answer are automatically determined using first components of the computerized device. The first components use different methods to produce the preliminary types, and each of the first components produces a preliminary type. A match between the preliminary type and the question LAT is automatically scored, using the computerized device. Each of the first components produces a first type-score. The first type-score represents a degree of match between the preliminary type and the question LAT. The scoring is differentiated based on which of the components produced the preliminary type. Each preliminary type and each first type-score is automatically evaluated using second components of the computerized device. Each of the second components produces a second score based on a combination of the first type-score and a measure of degree that the preliminary type matches the question LAT. The second components use different methods to produce the second score. A final score is automatically calculated based on the second score from each of the second components, using the computerized device. The final score, representing a degree of confidence that the candidate answer is a type that matches the question LAT, is automatically output, using the computerized device.

According to a method herein, a lexical answer type (LAT) associated with a question in a question-answering system is automatically identified, to produce a question LAT, using a computerized device. A candidate answer to the question is automatically generated, using the computerized device. Preliminary types for the candidate answer are automatically determined using first components of the computerized device. The first components use different resources to produce the preliminary types, and each of the first components produces a preliminary type for the candidate answer. A match between the preliminary type and the question LAT is automatically scored using the first components of the computerized device, producing a first type-score for each preliminary type based on an amount that the preliminary type corresponds to the question LAT. The first components use different resources to produce the first type-score for the preliminary type, and the scoring is differentiated based on which of the first components produced the preliminary type. Each of second components automatically evaluates each preliminary type and the first type-score, using the computerized device. Each of the second components produces a second score for the preliminary type for the candidate answer based on a combination of the first type-score and a measure of degree that the preliminary type matches the question LAT. A final score based on the second score from each of the second components is automatically output, using the computerized device. The final score represents a degree of confidence that the candidate answer is a type that matches the question LAT.

According to a computer system for determining a confidence score for candidate answers to questions in a question-answering system herein, the system comprises an automated question answering (QA) system comprising a query analysis module, a candidate answer generator operatively connected to the query analysis module, a processor comprising a plurality of first components, a plurality of second components operatively connected to the plurality of first components, and a classifier operatively connected to the plurality of second components, and a user interface operatively connected to the query analysis module. The user interface receives a question into the automated QA system. The query analysis module determines a question lexical answer type (LAT) for the question. The candidate answer generator automatically computes a candidate answer to the question. The processor automatically calculates a preliminary type for the candidate answer from each of the plurality of first components. The first components use different methods to produce the preliminary type. The processor automatically scores a match between the preliminary types and the question LAT to produce a first type-score from each of the plurality of first components based on an amount that the preliminary type corresponds to the question LAT. The scoring is differentiated based on which of the first components produced the preliminary type. A same preliminary type receives a different type-score based on differences between the first components that produced the same candidate answer type. The processor automatically evaluates each preliminary type and first type-score from each of the plurality of first components using each of the plurality of second components and produces a second score for the preliminary type based on a measure of degree that the preliminary type matches the question LAT for each of the plurality of second components. The processor automatically outputs a final score for the preliminary type from the classifier based on the second score for the preliminary type from each of the plurality of second components.

According to a computer program product for determining a confidence score for candidate answers to questions in a question-answering system herein, the computer program product comprises a tangible computer readable storage medium having program code embodied therewith. The program code is readable and executable by a computer to perform a method. According to the method, a question is received into a computerized device. A question LAT is determined. The question LAT is a lexical answer type associated with the question. A candidate answer to the question is identified. Preliminary types for the candidate answer are automatically determined using first components of the computerized device. The first components use different methods to produce the preliminary types, and each of the first components produces a preliminary type. A match between the preliminary type and the question LAT is automatically scored. Each of the first components produces a first type-score. The first type-score represents a degree of match between the preliminary type and the question LAT. The scoring is differentiated based on which of the components produced the preliminary type. Each preliminary type and each first type-score is automatically evaluated using second components of the computerized device. Each of the second components produces a second score based on a combination of the first type-score and a measure of degree that the preliminary type matches the question LAT. The second components use different methods to produce the second score. A final score is automatically calculated based on the second score from each of the second components. The final score, representing a degree of confidence that the candidate answer is a type that matches the question LAT, is automatically output.

BRIEF DESCRIPTION OF THE DRAWINGS

The systems and methods herein will be better understood from the following detailed description with reference to the drawings, which are not necessarily drawn to scale and in which.

DETAILED DESCRIPTION

Figure 1:
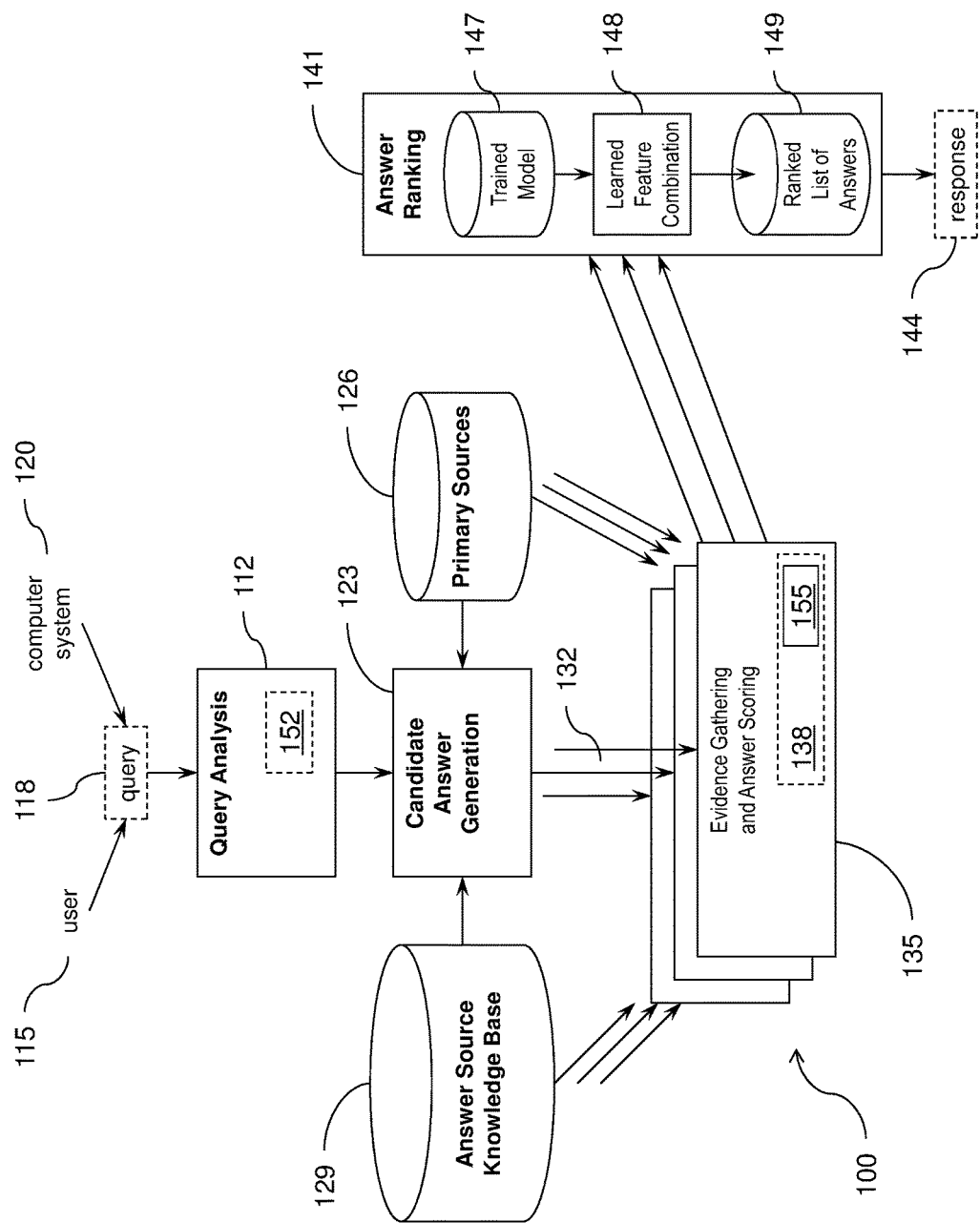
FIG. 1 is a high-level system diagram according to systems and methods herein.

It will be readily understood that the systems and methods of the present disclosure, as generally described and illustrated in the drawings herein, may be arranged and designed in a wide variety of different configurations in addition to the systems and methods described herein. Thus, the following detailed description of the systems and methods, as represented in the drawings, is not intended to limit the scope defined by the appended claims, but is merely representative of selected systems and methods. The following description is intended only by way of example, and simply illustrates certain concepts of the systems and methods, as disclosed and claimed herein.

As will be referred to herein, the word "question" and "query", and their extensions, are used interchangeably and refer to the same concept, namely a request for information. Such requests are typically expressed in an interrogative sentence, but they can also be expressed in other forms, for example as a declarative sentence providing a description of an entity of interest (where the request for the identification of the entity can be inferred from the context). "Structured information" (from "structured information sources") is defined herein as information whose intended meaning is unambiguous and explicitly represented in the structure or format of the data (e.g., a database table). "Unstructured information" (from "unstructured information sources") is defined herein as information whose intended meaning is only implied by its content (e.g., a natural language document). By "Semi-structured", it is meant data having some of the meaning explicitly represented in the format of the data, for example a portion of the document can be tagged as a "title".

FIG. 1 shows a high-level system diagram depicting logical architecture for a system 100 described herein. As shown in FIG. 1, the system 100 includes a Query Analysis module 112 implementing functions for receiving and analyzing a user question or query 118. According to one system and method, a "user" 115 refers to a person or persons interacting with the system 100, and the term "user query" refers to a query 118 (and its context) posed by a user 115. However, it is understood that other systems and methods can be constructed, where the term "user" refers to a computer system 120 generating a query 118 by mechanical means, and where the term "user query" refers to such a mechanically generated query and context. A Candidate Answer Generation module 123 is provided to implement a search for candidate answers by traversing Primary Sources 126 having structured, semi structured, and unstructured sources and an Answer Source Knowledge Base 129 containing collections of relations and lists extracted from primary sources. All the sources of information can be locally stored or distributed over a network, including the Internet. The Candidate Answer Generation module 123 generates a plurality of output data structures containing candidate answers 132 based upon the analysis of retrieved data.

In FIG. 1, a first system and method is depicted that includes an Evidence Gathering and Answer Scoring module 135 that interfaces with the Primary Sources 126 and the Answer Source Knowledge Base 129 to concurrently analyze the evidence based on passages having candidate answers and score each candidate answer 132, as parallel processing operations. The Evidence Gathering and Answer Scoring module 135 comprises a Candidate Answer Scoring module 138 for analyzing a retrieved passage and scoring each of the candidate answers 132 of a retrieved passage.

The Answer Source Knowledge Base 129 may comprise a corpus of data comprising one or more databases of structured or semi-structured sources (pre-computed or otherwise) comprising collections of relations (e.g., Typed Lists). In an exemplary implementation, the Answer Source Knowledge Base 129 may comprise a database stored in a memory storage system, e.g., a hard drive. The Answer Source Knowledge Base 129 may interface with several structured and unstructured sources including Typed Lists (e.g., list of all countries in the world), Precise Unary (e.g., a country), Binary (e.g., country+head of state of that country), Ternary (e.g., country+head of state of that country+wife of the head of state), n-ary Relation Extracted, etc.

An Answer Ranking module 141 provides functionality for ranking candidate answers 132 and determining a response 144 returned to a user 115 via a user's computer display interface (not shown) or a computer system 120, where the response may be an answer, an elaboration of a prior answer, or a request for clarification in response to a question when a high quality answer to the question is not found.

FIG. 1 shows a machine learning implementation where the Answer Ranking module 141 includes a trained model component 147 produced using machine learning techniques from prior data. The prior data may encode information on features of candidate answers 132, the features of passages the candidate answers come from, the scores given to them by the Candidate Answer Scoring modules 138, and whether the candidate answer 132 was correct or not. In other words, machine-learning algorithms can be applied to the entire content of the Candidate Answer Scoring modules 138 together with the information about correctness of the candidate answer. Such prior data is readily available, for instance, in technical services support functions or in more general settings on the Internet, where many websites list questions with correct answers. The model encodes a prediction function that is input to the learned feature combination module 148 shown in FIG. 1. The Answer Ranking module 141 may also include a module to produce a ranked list of answers 149 to provide a qualitative rank for the response 144 returned to a user 115.

It is understood that skilled artisans may implement a further extension to the system of the disclosure shown in FIG. 1, to employ one or more modules for enabling I/O communication between a user or computer system and the system 100 according to, but not limited to, the following modalities of text, audio, video, gesture, tactile input and output, etc. Thus, both an input query and a generated query response may be provided in accordance with one or more of multiple modalities including text, audio, image, video, tactile, or gesture. Thus, for example, if a question is posed using other modalities, e.g., a series of images pointed by the user, the method applies to the textual aspects of the images, captured in their descriptions or inferred by an analysis system (not shown).

The system 100 depicted in FIG. 1, may be local, on a server, or server cluster, within an enterprise, or alternately, may be distributed with or integral with or otherwise operate in conjunction with a public or privately available search engine in order to enhance the question answer functionality in the manner as described. Thus, the systems and methods may be provided as a computer program product comprising instructions executable by a processing device, or as a service deploying the computer program product. The architecture employs a search engine (a document retrieval system) as a part of the Candidate Answer Generation module 123, which may be dedicated to the Internet, a publicly available database, a website (e.g., IMDB.com) or, a privately available database. Databases can be stored in any storage system, e.g., a hard drive or flash memory, and can be distributed over the network.

As shown in FIG. 1, the Query Analysis module 112 receives an input comprising the query 118 entered, for example, by a user 115 via a web-based browser device. A query 118 input to the system 100 may comprise a string such as "Who was the tallest American president?". Alternately, a query 118 may consist of a string and an implicit context, e.g., "Who was the shortest?". In this example, context may range from a simple string e.g., "American presidents" or "Who was the tallest American president?" to any data structure, e.g., all intermediate results of processing of the previous strings—a situation arising e.g., in a multiple turn dialog. The query 118 is received by the Query Analysis module 112 which includes, but is not limited to, one or more of the following sub-processes: A Parse and Predicate Argument Structure block (not shown) that implements functions and programming interfaces for decomposing an input query into its grammatical and semantic components, e.g., noun phrases, verb phrases, and predicate/argument structure. An (English Slot Grammar) ESG-type parser may be used to implement parsing. A Focus Segment, Focus & Modifiers block may be provided that computes the focus and focus modifiers of the question. Further implementations may further include a Question Decomposition block (not shown) in the Query Analysis module 112 that implements functions and programming interfaces for analyzing the query 118 to determine the sets of constraints specified by the question about the target answer. In accordance with systems and methods herein, the Query Analysis module 112 includes a Lexical Answer Type (LAT) block 152 that implements functions and programming interfaces to provide additional constraints on the answer type. The computation in the Query Analysis module 112 comprises, but is not limited to, the Lexical Answer Type (LAT). The LAT is computed from a natural language analysis of the query 118 and provides a description of an answer rather than its ontological category.

In FIG. 1, the LAT block 152 includes certain functions/sub-functions (not shown) to determine the LAT. These sub-functions include a parser such as the ESG parser as described herein above, and a co-reference resolution module (as described, for example, in http://www.isi.edu/.about.hobbs/muc5-generic-final.pdf; and http://gate.ac.uk/sale/taln02/taln-ws-coref.pdf).

The certain functions/sub-functions operate to compute a LAT from a natural language analysis of the query and provide a description of an answer rather than its ontological category. Thus, for example, the italicized words in the following sentence represent the LAT "After circumnavigating the Earth, which explorer became mayor of Plymouth, England?" the answer must include both "explorer" and "mayor"; and these two strings become the question LATs.

As mentioned above, a LAT of the question/query 118 is the type (i.e., the descriptor) of the referent of the entity that is a valid answer to the question. In practice, LAT is the descriptor of the answer detected by a natural language understanding module (not shown) comprising a collection of patterns or a parser with a semantic interpreter.

With reference to the LAT block 152, in the Query Analysis module 112 of FIG. 1, the LAT represents the question terms that identify the semantic type of a correct answer. As is known, a LAT may be detected in a question through pattern rules such as "any noun phrase that follows the wh-word and serves as the subject or the object of the main verb in a question is a LAT". For example, in the question "Which Dublin-born actor once married Ellen Barkin?", the noun phrase "Dublin-born actor" follows the wh-word "which", and is the subject of the main verb, "marry". LAT detection rules can be encoded manually or learned by machine automatically through association rule learning. In this case, the natural language understanding module can be limited to implementation of the simple rules, as described above.

LATs should include modifiers of the main noun if they change its meaning. For example, a phrase "body of water" has different meaning than "water" or "body", and therefore in the following query the LAT has to include the whole phrase (italicized):

"Joliet and Co. found that the Mississippi emptied into what *body of water*?"

It is understood that multiple LATs can be present in the query and the context, and can even be present in the same clause. For example, the italicized words represent the LAT in the following queries:

"In 1581, a year after circumnavigating the Earth, which *explorer* became *mayor* of Plymouth, England?"

"Which New York City *river* is actually a *tidal strait* connecting upper New York Bay with Long Island Sound?"

Even though in many cases the LAT of the question can be computed using simple rules as described herein above, in other situations, such as when multiple LATs are present, the LATs are computed based on grammatical and predicate argument structure. Thus the natural language understanding module should include a parser (such as ESG is used to compute the grammatical structures) and a shallow semantic interpreter to compute the semantic co-reference between the discourse entities, such as "river" and "tidal strait" or "explorer" and "mayor", to add both of them to the list of LATs. It is understood that the LATs can include modifiers.

Thus, in the first example above, the list of LATs may contain explorer, mayor, mayor of Plymouth, mayor of Plymouth, England. A minimal possible noun phrase that identifies the answer type corresponds to the maximal entity set, and the maximal noun phrase provides the best match.

According to systems and methods herein, the Evidence Gathering and Answer Scoring module 135 includes several type coercion (TyCor) components 155, as described in further detail below, that test the candidate answers in order to determine that the candidate answer 132 is an appropriate type for the question/query 118.

Figure 2:
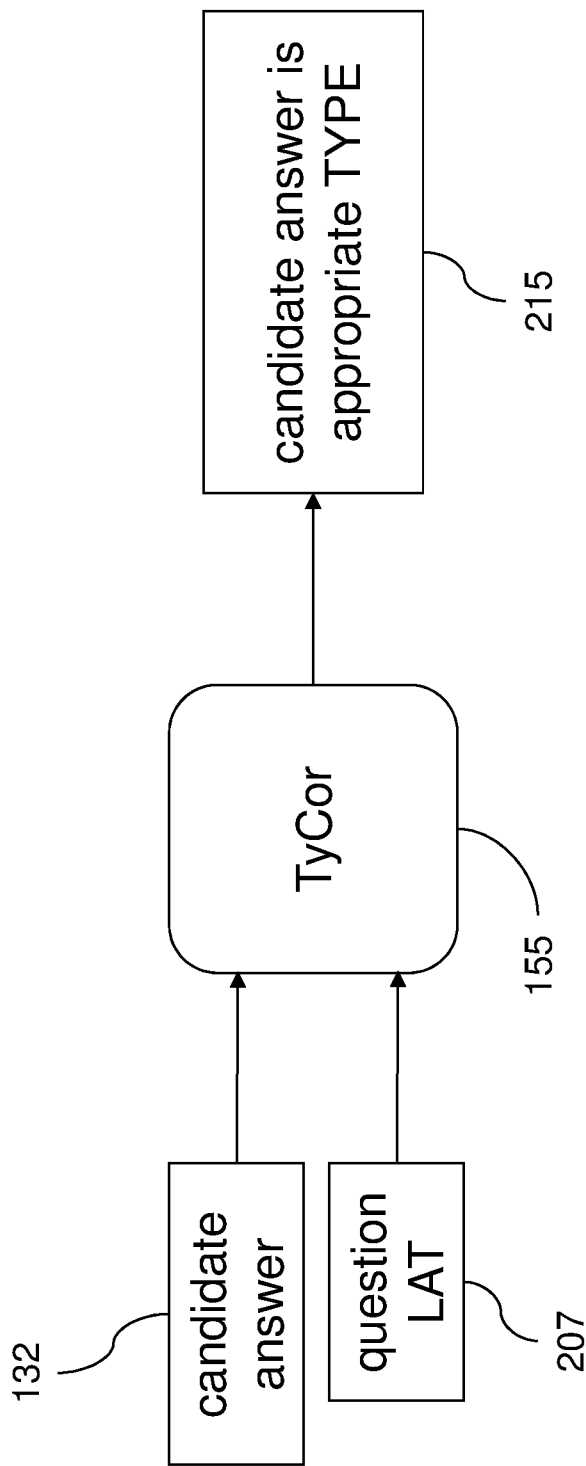
FIG. 2 is a block diagram illustrating various aspects of systems and methods herein.

Referring to FIG. 2, the type coercion framework consists of a suite of answer scoring components that each take a question LAT 207 and a candidate answer 132, and determine if the candidate answer 132 is of the lexical type of the question, returning a measure of degree that the type of the candidate answer is an appropriate lexical type 215. For each candidate answer 132, the candidate is matched against instances in a corpus of data (e.g., the Answer Source Knowledge Base 129). Candidate types associated with those instances in the corpus of data are retrieved. The question LAT 207 is matched with the candidate types, and a score is produced representing the degree of match. Each of the TyCor components 155 uses a source of typing information and performs several steps, such as described below, each of which is capable of error that impacts its confidence:

Entity Disambiguation and Matching (EDM): The most obvious, and most error-prone, step in using an existing source of typing information is to find the entity in that source that corresponds to the candidate answer. Since the candidate is just a string, this step accounts for both polysemy (the same name may refer to many entities) and synonymy (the same entity may have multiple names). Each source may require its own special EDM implementations that exploit properties of the source; for example, DBpedia encodes useful naming information in the entity URI. EDM implementations typically try to use some context for the answer, but in purely structured sources, this context may be difficult to exploit.

Predicate Disambiguation and Matching (PDM): Similar to EDM, the type in the source that corresponds to the LAT is found. In some sources, this is the same algorithm as EDM, in others, type looking requires special treatment. In a few, especially those using unstructured information as a source, the PDM step just returns the LAT itself. In type-and-generate, this step corresponds to producing a semantic answer type (SAT) from the question. PDM corresponds strongly to notions of word sense disambiguation with respect to a specific source.

Type Retrieval (TR): After EDM, the types of the retrieved entity are retrieved. For some TyCor components, such as those using structured sources, this step exercises the primary function of the source and is simple. In others, such as those using unstructured sources, this may require parsing or other semantic processing of some small snippet of natural language.

Type Alignment: The results of the PDM and TR steps are then compared to determine the degree of match. In sources containing e.g., a type taxonomy, this includes checking the taxonomy for subsumption, disjointness, etc. For other sources, type alignments utilize resources such as WordNet for finding synonyms, hypernyms, etc. between the types.

Each of the steps above generates a type-score reflecting the accuracy of its operation, taking into account the uncertainty of the entity mapping or information retrieval process. The final score produced by each of the TyCor components 155 is a combination of the analysis step scores and the confidence in the type of the candidate answer. Some examples of specific scoring methodologies are described in detail in U.S. Patent Application Publication No. US 2009/0292687 A1.

In particular, the candidate answer 132 and type(s) are represented as lexical strings. Production of the score, referred to herein as the type-score, is comprised of several steps: candidate answer to instance matching, instance to type association extraction, and LAT to type matching. The type-score reflects the degree to which the candidate answer may be "coerced" to the LAT, where higher scores indicate a better coercion.

In candidate answer to instance matching, the candidate answer is matched against an instance or instances within the knowledge resource, where the form that the instance takes depends on the knowledge resource. With a structured knowledge base, instances may be entities; with an encyclopedic source, such as Wikipedia, instances may be entries in the encyclopedia; with lexical resources, such as WordNet (lexical database), instances may be synset entries (sets of synonyms); and with unstructured document (or webpage) collections, instances may be any terms or phrases occurring within the text. If multiple instances are found, a rollup using an aggregation function may be employed to combine the scores from all candidate answers. If no suitable instance is found, a score of 0 is returned.

Next, instance association information is extracted from the resource. This information associates each instance with a type or set of types. Depending on the resource, this may take different forms; in a knowledge base, this corresponds to particular relations of interest that relate instances to types, with an encyclopedic source, this could be lexical category information which assigns a lexical type to an entity, with lexical resources, such as WordNet, this is a set of lexical relations, such as hyponymy, over synsets (e.g., "artist" is a "person"), and with unstructured document collections this could be co-occurrence or proximity to other terms and phrases representing type.

Then, each LAT is attempted to match against each type. A lexical manifestation of the type is used. For example, with encyclopedias, this could be the string representing the category; with a lexical resource, such as WordNet, this could be the set of strings contained within the synset. The matching is performed by using string matching or additional lexical resources, such as WordNet, to check for synonymy or hyponymy between the LAT and type. Special logic may be implemented for types of interest; for example, person matcher logic may be activated, which requires not a strict match, synonym, or hyponym relation, but rather that both LAT and type are hyponyms of the term "person". In this way, "he" and "painter", for example, would be given a positive score even though they are not strictly synonyms or hyponyms. Finally, the set of pairs of scores scoring the degree of match may be resolved to a single final score via an aggregation function. The final score represents the degree of confidence that the candidate answer is a type that matches the question LAT 207.

Figure 3:
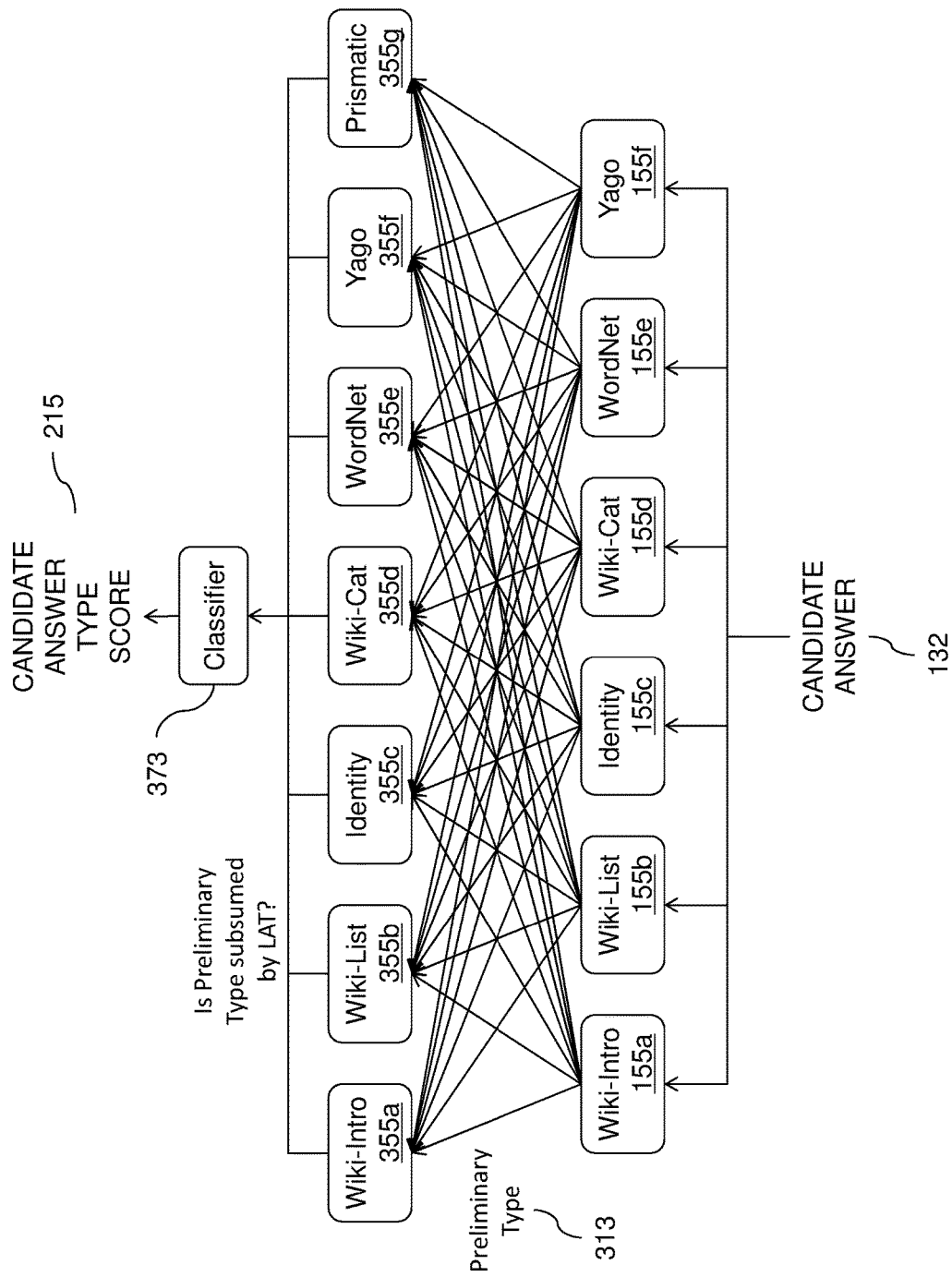
FIG. 3 is a block diagram illustrating various aspects of systems and methods herein.

The disclosure herein describes a method and system of combining multiple TyCor components 155 to determine if the candidate answer 132 is of the lexical type 215 of the question. FIG. 3 shows an example of type coercion chaining according to systems and method herein. As shown in FIG. 3, a first set of TyCor components 155a-155f may be used in combination to provide input to a second set of TyCor components 355a-355g. As illustrated in FIG. 3, the first set of TyCor components 155a-155f includes six components and the second set of TyCor components 355a-355g includes seven components. Other numbers of TyCor components may be used. Each of the TyCor components 155a-155f evaluates the candidate answer 132 according to its own methodology and provides a preliminary type and a type-score based on its own confidence that the candidate answer 132 matches the question LAT 207. The thresholds used in the various TyCor components 155a-155f and the weights of their respective rules may be determined based on empirical evaluation.

The "answer-type" classification process depends on the resource that the candidate answer 132 comes from. Different methods are applied to different resources (structured vs. unstructured, semantic vs. lexical, etc.) to find the answer-type of a candidate answer 132. In other words, the different resources may produce different preliminary types 313.

First, each of a first set of TyCor components (Wiki-intro 155a, Wiki-List 155b, Identity 155c, Wiki-category 155d, WordNet 155e, and Yago 155f) attempts to obtain a type of the input candidate answer 132. Because different TyCor components 155a-155f use different resources and different algorithms, they may extract different preliminary types 313 for the same candidate answer.

That is, the answer type of a given candidate answer may be found by applying a different resource-specific methodology to each different resource or database for its type coercion methodology. For example, different resources (Wiki-List, WordNet, Yago, etc.) that might produce a preliminary type 313 for the candidate answer have different answer-type finding algorithms applied to them to find the answer type. Thus, use of different resource-specific type classification methodologies may result in the different resources producing different type categories for the same candidate answer, simply because the candidate answer 132 is evaluated differently.

Additionally, each of the TyCor components 155a-155f generates a type-score reflecting the accuracy of its operation, taking into account the uncertainty of the entity mapping or information retrieval process. The different resource-specific answer-type classification methodologies may score the probability that an answer-type matches the question LAT differently. In other words, one resource-specific methodology might give a 70% probability that the answer-type matches the question LAT, while another resource-specific methodology might give a 90% probability that the same answer-type matches the question LAT. Of course, different resource-specific methodologies may also come up with different answer-types.

According to systems and methods herein, the results of the different TyCor component combinations can be posted directly as features to help scoring the preliminary type 313 for the candidate answer 132. The problem is not so much that the candidate answer 132 is "correct" but rather, in this evaluation, that the candidate answer 132 addresses the right type of question. For example, an input query, to wit:

"Which 19th century US presidents were assassinated?" should compute a lexical answer type (LAT) as "19th century US president" (but also as "US president" and "president"). Candidate answers might include "Abraham Lincoln", "James A. Garfield", "William McKinley", and "John F. Kennedy", the latter two of which would be wrong answers but may be the correct type. Candidate answers that include "Secretariat" and "War of 1812" should be evaluated as being a wrong type.

The output of each of the first set of TyCor components 155a-155f provides input to each of another set of TyCor components (in this case Wiki-intro 355a, Wiki-List 355b, Identity 355c, Wiki-category 355d, WordNet 355e, Yago 355f, and Prismatic 355g). Note that the sets of TyCor components used need not be identical. According to systems and methods herein, any combinations of TyCor components can be used. The output from each of the first set of TyCor components 155a-155f includes a preliminary type 313 and a first type-score.

The second set of TyCor components 355a-355g evaluates the preliminary type 313 for the candidate answer and first type-scores from each of the first set of TyCor components 155a-155f in order to produce a second score for the preliminary type 313. The second score is based on a combination of the first type-score and a measure of degree that the preliminary type 313 matches the question LAT 207 based on the methodology and resources for each of the second set of TyCor components 355a-355g. The second set of TyCor components 355a-355g can use the provenance information (i.e., which TyCor component extracted the preliminary type 313 for the candidate answer) as features.

The classifier 373 evaluates the second score from each of the second set of TyCor components 355a-355g and determines a final score representing the degree of confidence that the candidate answer 132 is of the lexical type of the question by aggregating the second score from each of the second set of TyCor components 355a-355g. The classifier 373 can be trained from a set of ground truth instances of annotated training data by machine learning algorithms, such as logistic regression, or can be implemented as a set of manually crafted rules. Classification rules can be encoded manually or learned automatically through association rule learning.

Additionally, the second set of TyCor components 355a-355g can be used to determine if the preliminary type 313 is subsumed by the question LAT 207 (i.e., is a subtype of the question LAT 207). Note that the sets of TyCor components used are not identical. According to systems and methods herein, any combinations of TyCor components can be used to determine the possible types of the instances, and to determine whether the types are subtypes of the question LAT 207.

Figure 4:
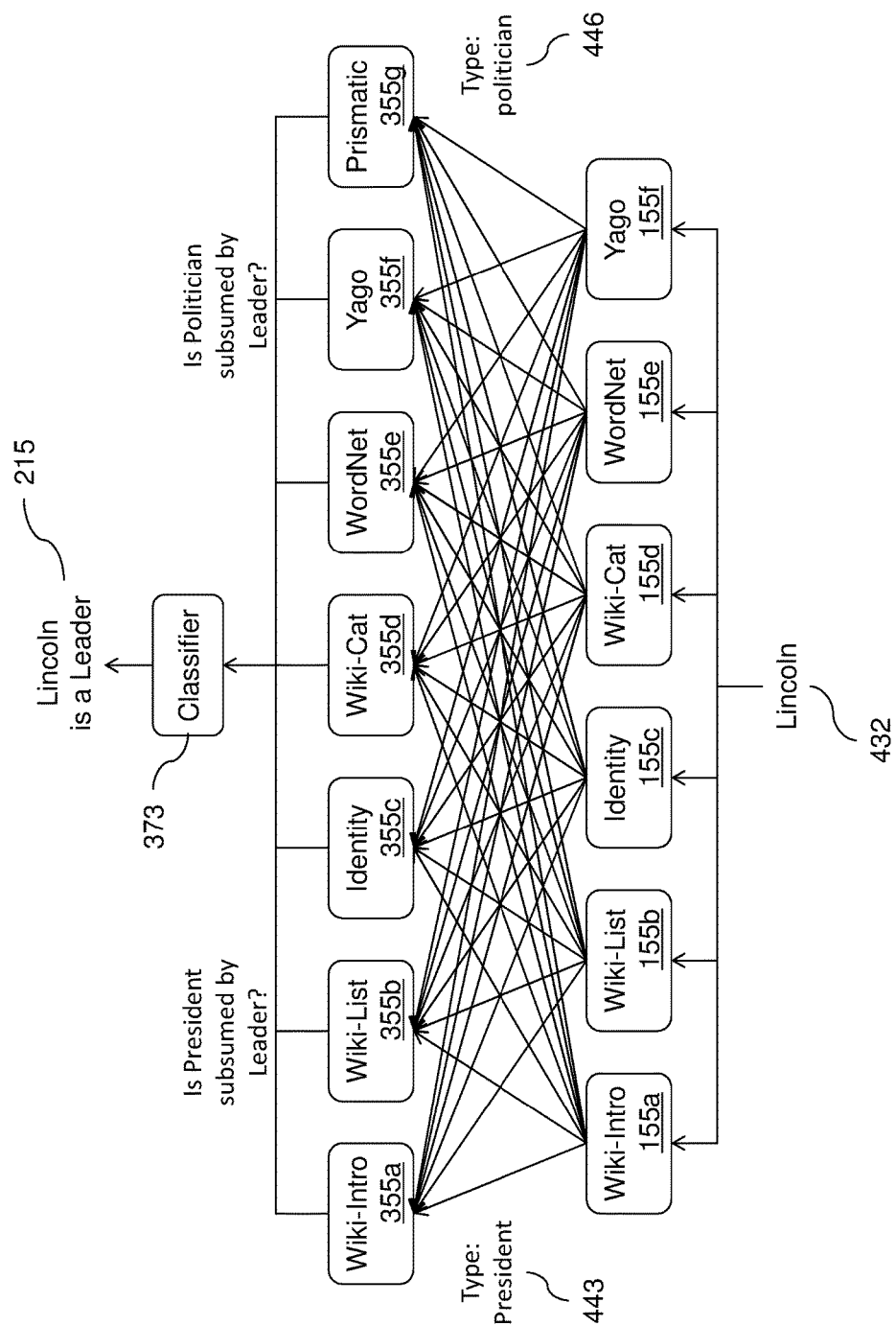
FIG. 4 is a block diagram illustrating various aspects of systems and methods herein.

FIG. 4 shows an example of type coercion chaining. If the example question is:

"What leader gave a speech at the dedication of a national cemetery in Gettysburg, Pa.?" Based on analysis, the question LAT 207 may be "leader". A candidate answer 432 may be "Lincoln". The task is to determine if "Lincoln" is a leader. The chain of TyCor components may produce an output through the following process:

First, each of a first set of TyCor components (Wiki-intro 155a, Wiki-List 155b, Identity 155c, Wiki-category 155d, WordNet 155e, and Yago 155f) attempts to obtain a type of the input candidate answer 432. Because different TyCor components 155a-155f use different resources and different algorithms, they may extract different preliminary types for the same candidate answer. In this example, the candidate answer 432 of "Lincoln" may extract two or more preliminary types, such as, President 443 and Politician 446. While a preliminary type of Automobile may be extracted, it is expected that that would have a very low first score.

As described above, the preliminary type of a given candidate answer may be found by applying a different resource-specific methodology to each different resource that produces a candidate answer. For example, different resources (Wiki-List, WordNet, Yago, etc.) that might produce a candidate answer have different answer-type finding algorithms applied to them to find the answer type. Thus, use of different resource-specific type classification methodologies may result in the different resources producing different type categories (president answer-type and politician answer-type) for the same candidate answer, simply because the candidate answer 432, Lincoln, came from different resources.

The output of the first set of TyCor components 155a-155f provides input to each of a second set of TyCor components (Wiki-intro 355a, Wiki-List 355b, Identity 355c, Wiki-category 355d, WordNet 355e, Yago 355f, and Prismatic 355g). The output from each of the first set of TyCor components 155a-155f includes a preliminary type, such as President 443 and Politician 446, and a first type-score. The second set of TyCor components 355a-355g determine if the types (e.g., President 443 and Politician 446) are subsumed by the question LAT 207 "leader" (i.e., is a subtype of the question LAT 207).

As described above, each of the first set of TyCor components 155a-155f generates a type-score reflecting the accuracy of its operation, taking into account the uncertainty of the entity mapping or information retrieval process. The different resource-specific answer-type classification methodologies may score the probability that a preliminary type matches the question LAT 207 differently. In this example, one resource-specific methodology might give a 70% probability that the preliminary type "president" 443 matches the "leader" LAT, while another resource-specific methodology might give a 90% probability that the same preliminary type "president" 443 matches the "leader" LAT. Of course, different resource-specific methodologies will also come up with different preliminary types (e.g., preliminary type "politician" 446).

The second set of TyCor components 355a-355g evaluates the preliminary types President 443 and Politician 446 for the candidate answer and the first type-score from each of the first set of TyCor components 155a-155f in order to produce a second score for each of the preliminary types President 443 and Politician 446. The second score is based on a combination of the first type-score and a measure of degree that the preliminary types President 443 and Politician 446 match the question LAT 207 "leader" based on the methodology and resources for each of the second set of TyCor components 355a-355g. The second score is a numeric value to indicate the degree of matchness of type-to-LAT.

The classifier 373 uses the outputs of the second set of TyCor components 355a-355g to determine whether the candidate answer 432 "Lincoln" is a leader or not. The classifier 373 evaluates the second score from each of the second set of TyCor components 355a-355g and determines a final score representing the confidence that the candidate answer 432 "Lincoln" is of the lexical type of the question ("leader").

The classifier 373 aggregates the second score from each of the components of the second set of TyCor components 355a-355g and uses the provenance information (i.e., which TyCor component extracted the type for the candidate answer and which TyCor components determine the preliminary type is a subtype of the question LAT) as features. The output of the classifier 373 is a final score representing the confidence that the candidate answer 432 "Lincoln" is of the lexical type ("leader") of the question.

The principles of the systems and methods disclosed herein may be advantageously employed in applications of several vertical domains: domains where applications involving text analytics are growing, and where navigation through large amounts of data is becoming of concern. For instance, example domains may include, but are not limited to, e.g., biotech, finance, marketing, legal, etc.

Moreover, the present concepts may be extended to cover information seeking dialog, not just question answering. This has application both for spoken dialog, e.g., between man and machine (telephone, computer) and, e.g., for multimodal dialog using speech and text that leverages both rule based approach to creating of dialog models or a combination of statistical and rule based dialog modeling. As such, it does not permit context switching without a large degradation of performance. Deferred type matching as performed in accordance with the system and methods herein, should decrease degradation and allow context switching.

Yet in another system and method, the concepts may be extended to cover information mining where data is often of poor quality but context should help, e.g., information extraction from meeting recordings.

Figure 5:
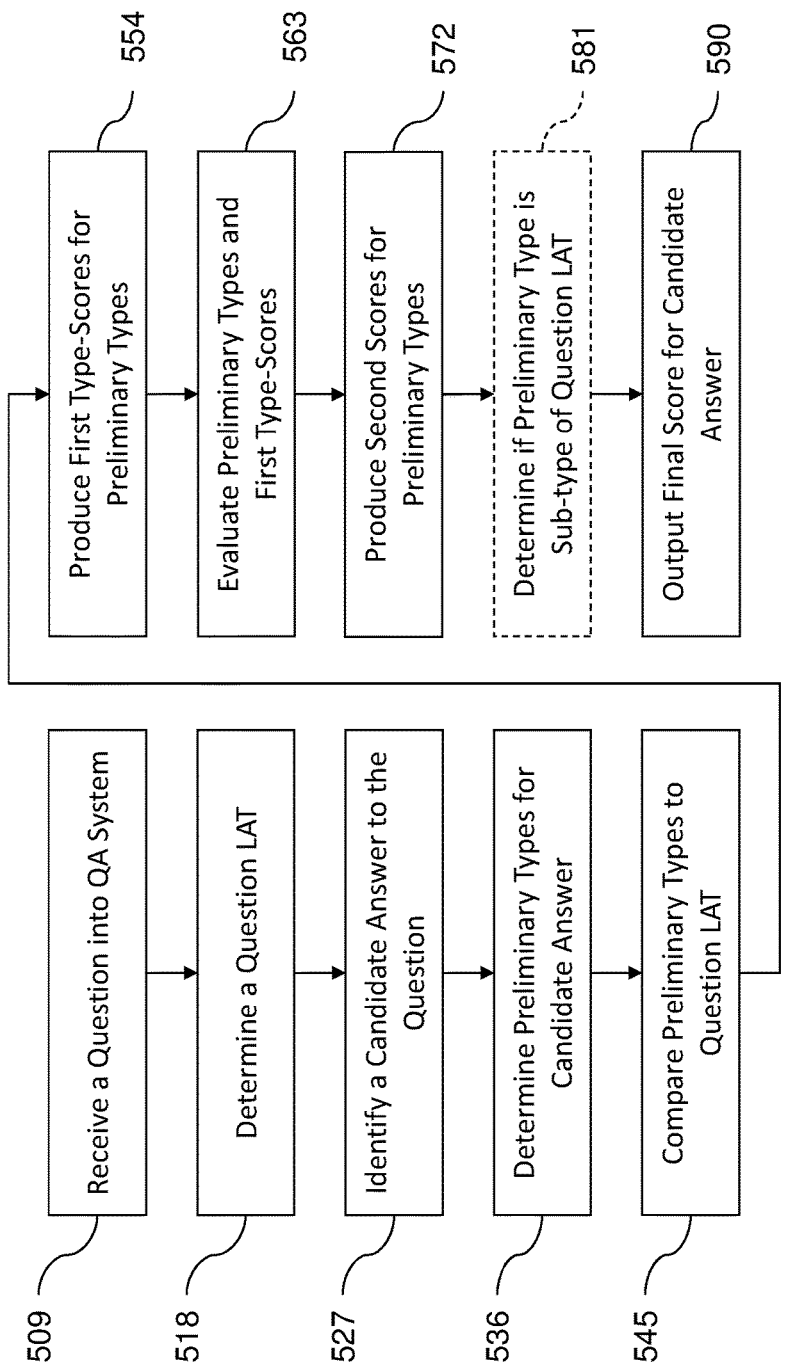
FIG. 5 is a flow diagram illustrating systems and methods herein.

FIG. 5 is a flow diagram illustrating the processing flow of an exemplary method of determining a confidence score for candidate answers to questions in a question-answering system according to systems and methods herein. At 509, a question is received into an automated QA system comprising a corpus of data. Automated query analysis is performed, at 518, to determine a lexical answer type (LAT) associated with the question. At 527, a candidate answer generator identifies a candidate answer to the question using the corpus of data. At 536, preliminary types are determined for the candidate answer, using a first plurality of TyCor components. Each of the first plurality of TyCor components uses different resources (algorithms and/or databases) to produce the preliminary types, and each of the first plurality of TyCor components produces a preliminary type. The TyCor components may produce different preliminary types for a same candidate answer, based on different methods. At 545, each of the first plurality of TyCor components compares the preliminary type to the question LAT and, at 554, using an automated scoring function of the TyCor components, produces first type-scores for the preliminary type, based on an amount that the preliminary type corresponds to the question LAT. A same preliminary type for the candidate answer may receive different type-scores based on differences between the TyCor components that produced the same preliminary type. At 563, each of the preliminary types for the candidate answer and the first type-scores are evaluated using a second plurality of TyCor components. Each of the second plurality of TyCor components produces a second score for the preliminary type, at 572, based on a combination of the first type-scores and a measure of degree that the preliminary type matches the question LAT. The scoring is differentiated based on which of the first plurality of TyCor components produced the preliminary types. Each of the second plurality of TyCor components evaluates each preliminary type and the first type-score from each one of the first plurality of TyCor components. In some methods, the second plurality of TyCor components determines whether the preliminary types are subtypes of the question LAT, at 581, based on how well the candidate answer types match the question LAT. At 590, a final score representing a degree of confidence that the candidate answer is a type that matches the question LAT is output. The final score is based on an aggregation of the second score from each of the second plurality of TyCor components.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 5. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 5.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

Figure 6:
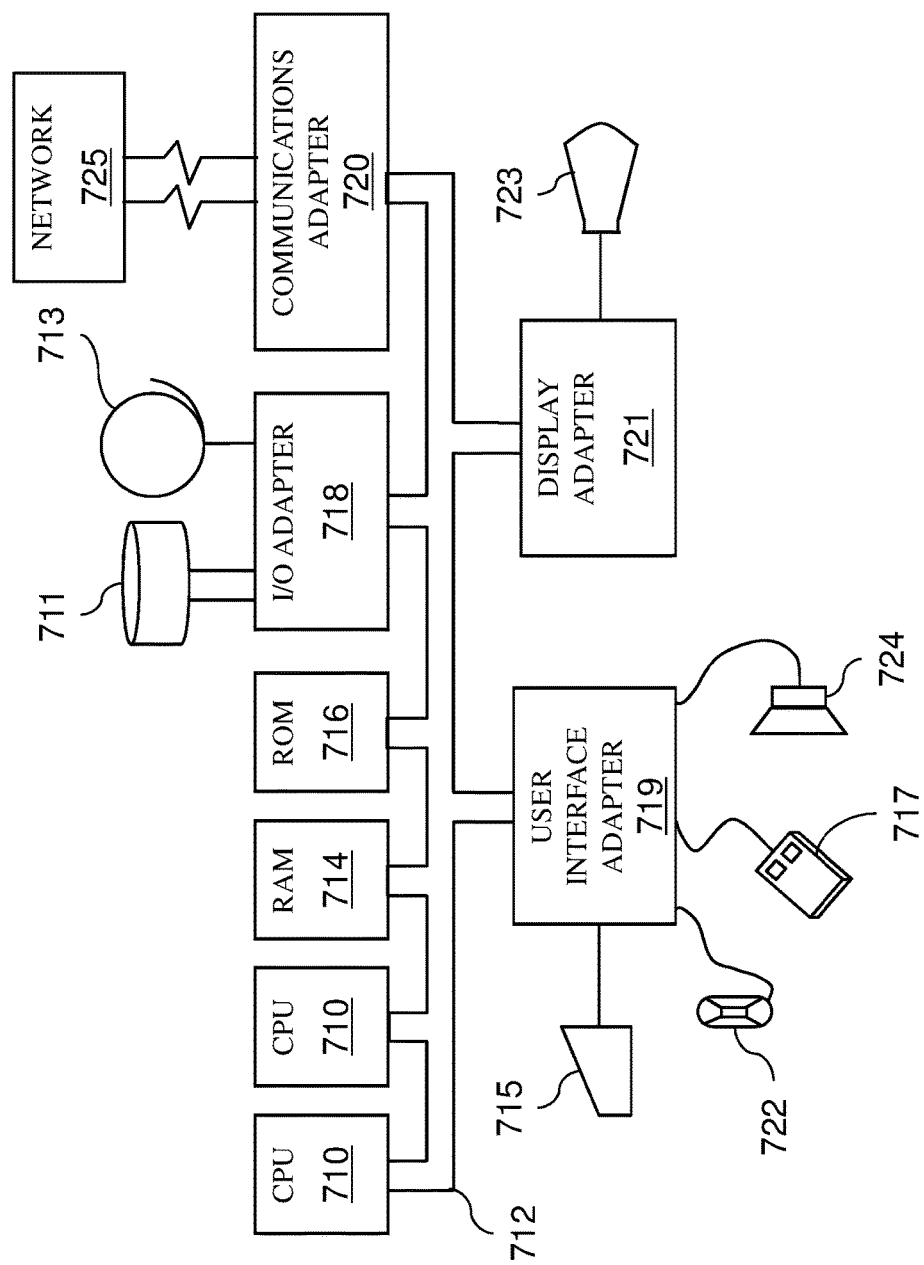
FIG. 6 is a schematic diagram of a hardware system according to systems and methods herein.

A representative hardware environment for practicing the systems and methods herein is depicted in FIG. 6. This schematic drawing illustrates a hardware configuration of an information handling/computer system in accordance with the systems and methods herein. The system comprises at least one processor or central processing unit (CPU) 710. The CPUs 710 are interconnected via system bus 712 to various devices such as a Random Access Memory (RAM) 714, Read-Only Memory (ROM) 716, and an Input/Output (I/O) adapter 718. The I/O adapter 718 can connect to peripheral devices, such as disk units 711 and tape drives 713, or other program storage devices that are readable by the system. The system can read the inventive instructions on the program storage devices and follow these instructions to execute the methodology of the systems and methods herein.

In FIG. 6, CPUs 710 perform various processing based on a program stored in a Read Only Memory (ROM) 716 or a program loaded from a peripheral device, such as disk units 711 and tape drives 713 to a Random Access Memory (RAM) 714. In the RAM 714, required data when the CPU 710 performs the various processing or the like is also stored, as necessary. The CPU 710, the ROM 716, and the RAM 714 are connected to one another via a bus 712. An input/output adapter 718 is also connected to the bus 712 to provide an input/output interface, as necessary. A removable medium, such as a magnetic disk, an optical disk, a magneto-optical disk, a semiconductor memory, or the like, is installed on the peripheral device, as necessary, so that a computer program read therefrom may be installed into the RAM 714, as necessary.

The system further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 including a network interface card such as a LAN card, a modem, or the like connects the bus 712 to a data processing network 725. The communication adapter 720 performs communication processing via a network such as the Internet. A display adapter 721 connects the bus 712 to a display device 723, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium such as the removable medium.

Those skilled in the art would appreciate that the storage medium is not limited to the peripheral device having the program stored therein as illustrated in FIG. 6, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 716, a hard disk contained in the storage section 711, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read-Only Memory (ROM), an Erasable Programmable Read-Only Memory (EPROM or Flash memory), an optical fiber, a magnetic storage device, a portable compact disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server, and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Alternatively, the process software is sent directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

While it is understood that the process software may be deployed by manually loading directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

Figure 7:
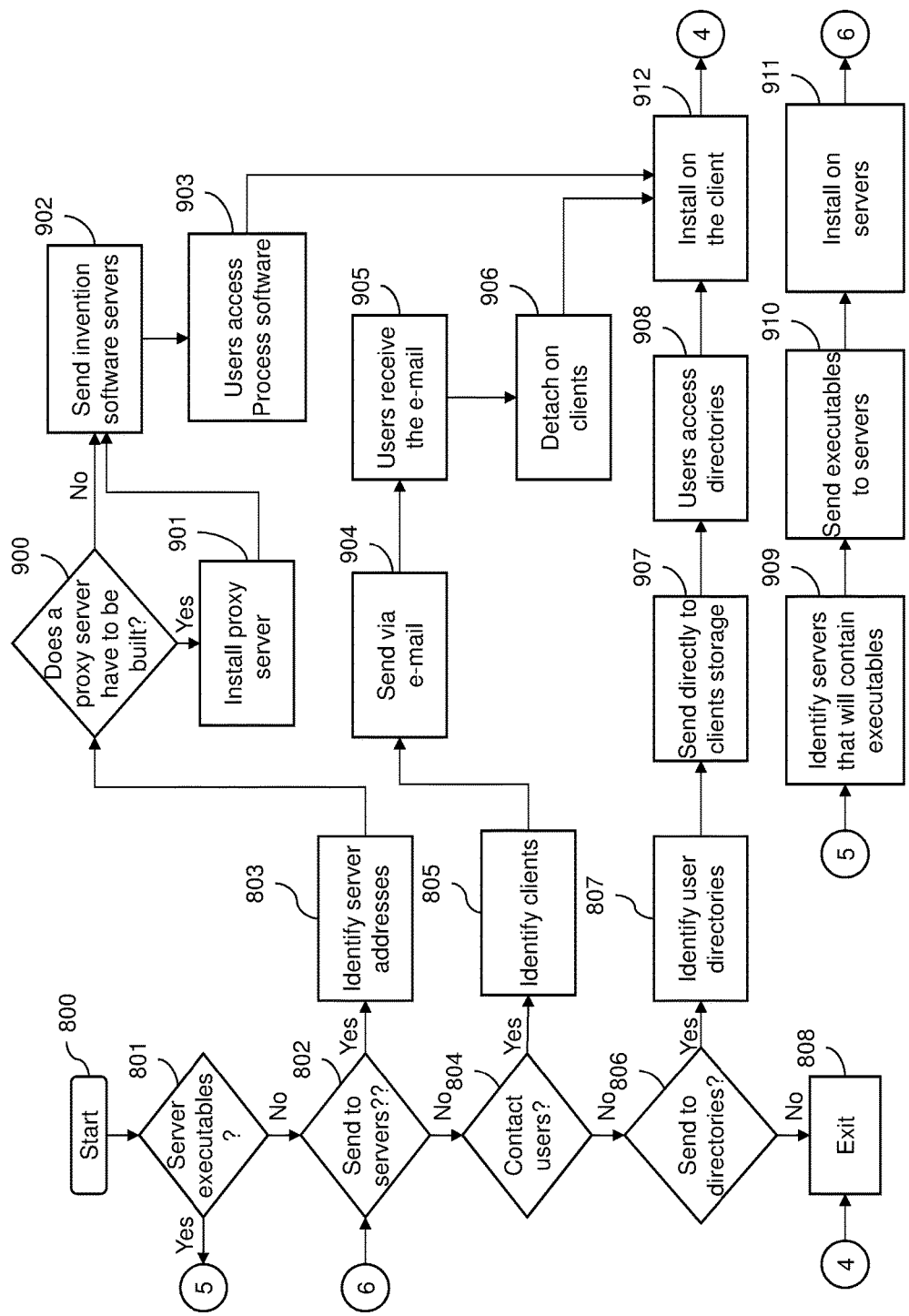
FIG. 7 is a schematic diagram of a deployment system according to systems and methods herein.

In FIG. 7, step 800 begins the deployment of the process software. The first thing is to determine if there are any programs that will reside on a server or servers when the process software is executed 801. If this is the case, then the servers that will contain the executables are identified 909. The process software for the server or servers is transferred directly to the servers' storage via FTP or some other protocol, or by copying through the use of a shared file system 910. The process software is then installed on the servers 911.

Next, a determination is made on whether the process software is to be deployed by having users access the process software on a server or servers 802. If the users are to access the process software on servers, then the server addresses that will store the process software are identified 803.

A determination is made if a proxy server is to be built 900 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 901. The process software is either sent to the servers via a protocol such as FTP or it is copied directly from the source files to the server files via file sharing 902. Another method would be to send a transaction to the servers that contain the process software and have the server process the transaction, then receive and copy the process software to the server's file system. Once the process software is stored at the servers, the users, via their client computers, then access the process software on the servers and copy it to their client computers file systems 903. Another method is to have the servers automatically copy the process software to each client and then run the installation program for the process software at each client computer. The users execute the program that installs the process software on their client computer 912, and then exit the process 808.

In step 804, a determination is made whether the process software is to be deployed by sending the process software to users via e-mail. The set of users where the process software will be deployed are identified together with the addresses of the user client computers 805. The process software is sent via e-mail 904 to each of the users' client computers. The users receive the e-mail 905 and then detach the process software from the e-mail to a directory on their client computers 906. The users execute the program that installs the process software on their client computer 912, and then exit the process 808.

Lastly, a determination is made on whether the process software will be sent directly to user directories on their client computers 806. If so, the user directories are identified 807. The process software is transferred directly to the users' client computer directory 907. This can be done in several ways such as, but not limited to, sharing of the file system directories and then copying from the sender's file system to the recipient users' file system or alternatively using a transfer protocol such as File Transfer Protocol (FTP). The users access the directories on their client file systems in preparation for installing the process software 908. The users execute the program that installs the process software on their client computer 912, and then exit the process 808.

The process software is integrated into a client, server, and network environment by providing for the process software to coexist with applications, operating systems, and network operating systems software, and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems will be identified and compared to the list of operating systems, version numbers, and network software that have been tested to work with the process software. Those operating systems, version numbers, and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8:
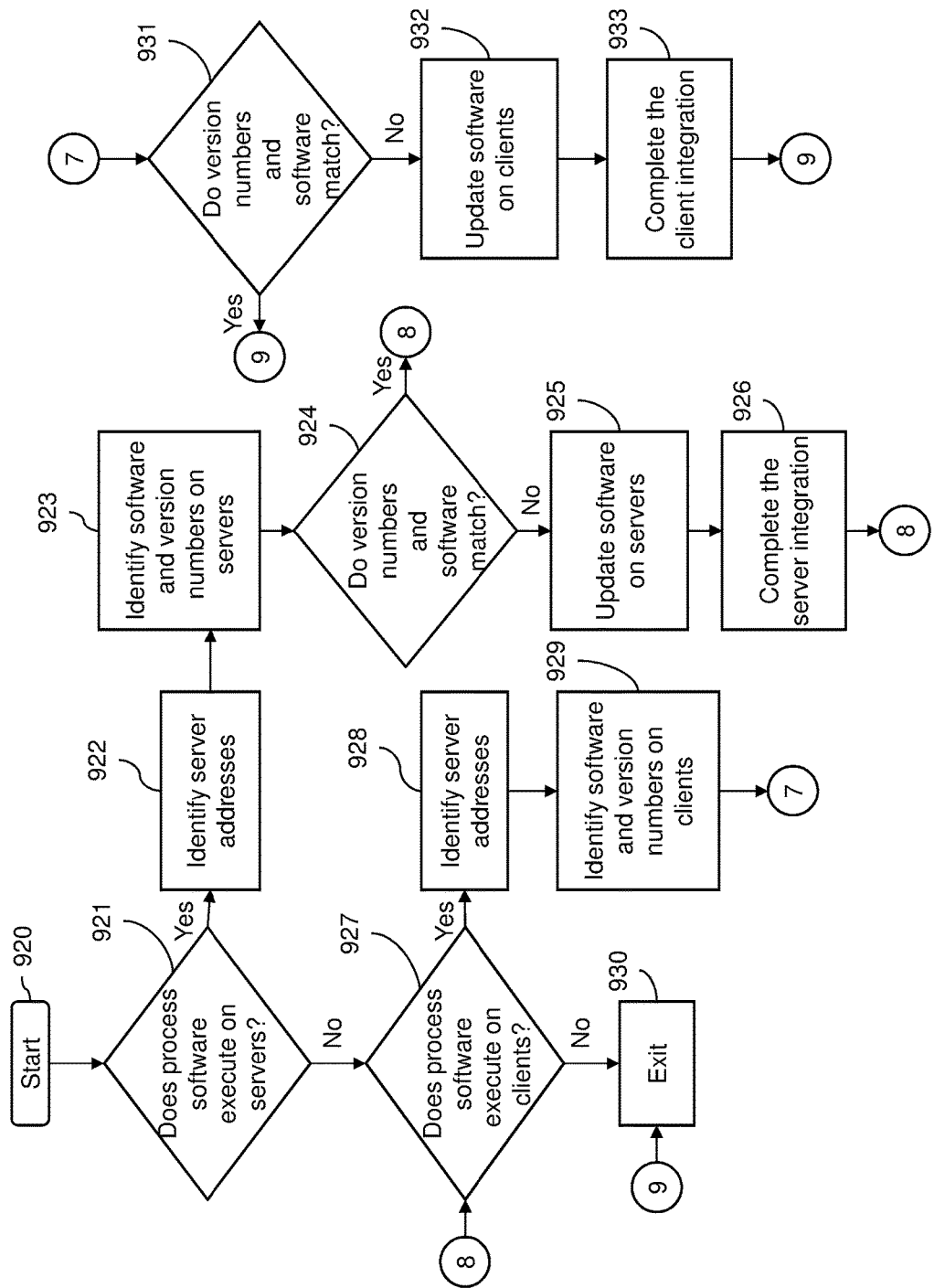
FIG. 8 is a schematic diagram of an integration system according to systems and methods herein.

In FIG. 8, step 920 begins the integration of the process software. The first thing is to determine if there are any process software programs that will execute on a server or servers 921. If this is not the case, then integration proceeds to 927. If this is the case, then the server addresses are identified 922. The servers are checked to see if they contain software that includes the operating system (OS), applications, and network operating systems (NOS), together with their version numbers that have been tested with the process software 923. The servers are also checked to determine if there is any missing software that is required by the process software 923.

A determination is made if the version numbers match the version numbers of OS, applications, and NOS that have been tested with the process software 924. If all of the versions match and there is no missing required software, the integration continues in 927.

If one or more of the version numbers do not match, then the unmatched versions are updated on the server or servers with the correct versions 925. Additionally, if there is missing required software, then it is updated on the server or servers 925. The server integration is completed by installing the process software 926.

Step 927, which follows either step 921, 924, or 926, determines if there are any programs of the process software that will execute on the clients. If no process software programs execute on the clients, the integration proceeds to 930 and exits. If this not the case, then the client addresses are identified 928.

The clients are checked to see if they contain software that includes the operating system (OS), applications, and network operating systems (NOS), together with their version numbers that have been tested with the process software 929. The clients are also checked to determine if there is any missing software that is required by the process software 929.

A determination is made as to whether the version numbers match the version numbers of OS, applications, and NOS that have been tested with the process software 931. If all of the versions match and there is no missing required software, then the integration proceeds to 930 and exits.

If one or more of the version numbers do not match, then the unmatched versions are updated on the clients with the correct versions 932. In addition, if there is missing required software then it is updated on the clients 932. The client integration is completed by installing the process software on the clients 933. The integration proceeds to 930 and exits.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents one measurement of use. Other measurements of use include, but are not limited to, network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider. In another method, the service provider requests payment directly from a customer account at a banking or financial institution. In another method, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents one measurement of use. Other measurements of use include, but are not limited to, network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider.

In another method, the service provider requests payment directly from a customer account at a banking or financial institution.

In another method, if the service provider is also a customer of the customer that uses the process software application, the payment owed to the service provider is reconciled to the payment owed by the service provider to minimize the transfer of payments.

Figure 9:
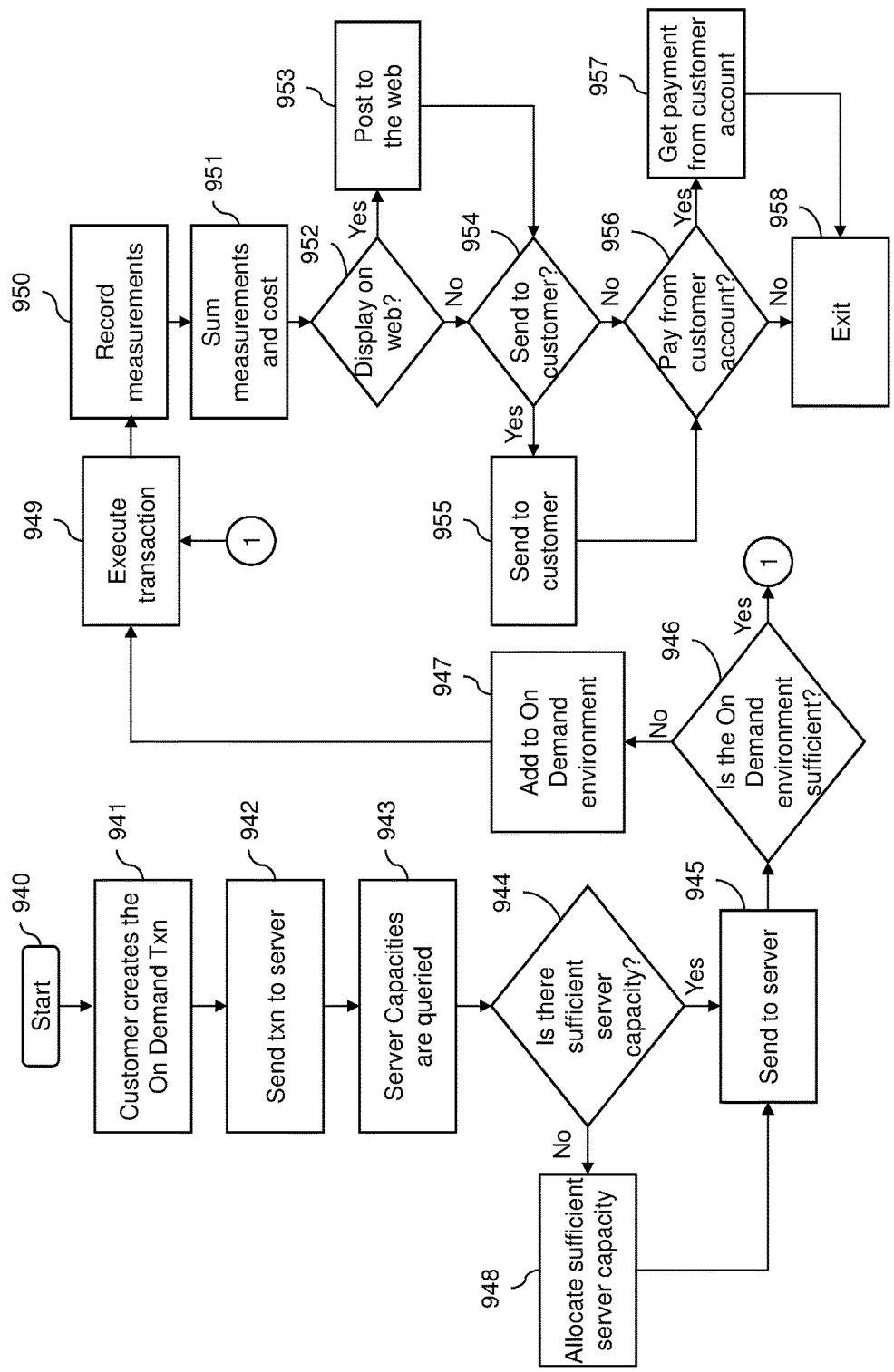
FIG. 9 is a schematic diagram of an on demand system according to systems and methods herein.

In FIG. 9, step 940 begins the On Demand process. A transaction is created that contains the unique customer identification, the requested service type, and any service parameters that further specify the type of service 941. The transaction is then sent to the main server 942. In an On Demand environment, the main server can initially be the only server, then, as capacity is consumed, other servers are added to the On Demand environment.

The server central processing unit (CPU) capacities in the On Demand environment are queried 943. The CPU requirement of the transaction is estimated, then the servers' available CPU capacity in the On Demand environment are compared to the transaction CPU requirement to see if there is sufficient CPU capacity available in any server to process the transaction 944. If there is not sufficient server CPU capacity available, then additional server CPU capacity is allocated to process the transaction 948. If there was already sufficient CPU capacity available, then the transaction is sent to a selected server 945.

Before executing the transaction, a check is made of the remaining On Demand environment to determine if the environment has sufficient available capacity for processing the transaction. This environment capacity consists of such things as, but not limited to, network bandwidth, processor memory, storage etc. 946. If there is not sufficient available capacity, then capacity will be added to the On Demand environment 947. Next, the required software to process the transaction is accessed, loaded into memory, and then the transaction is executed 949.

The usage measurements are recorded 950. The usage measurements consist of the portions of those functions in the On Demand environment that are used to process the transaction. The usage of such functions as, but not limited to, network bandwidth, processor memory, storage, and CPU cycles are what is recorded. The usage measurements are summed, multiplied by unit costs, and then recorded as a charge to the requesting customer 951. If the customer has requested that the On Demand costs be posted to a web site 952, then they are posted 953.

If the customer has requested that the On Demand costs be sent via e-mail to a customer address 954, then they are sent 955. If the customer has requested that the On Demand costs be paid directly from a customer account 956, then payment is received directly from the customer account 957. The last step is to exit the On Demand process 958.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed, and executed through the use of dedicated equipment and large-scale encryption, which are used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 10:
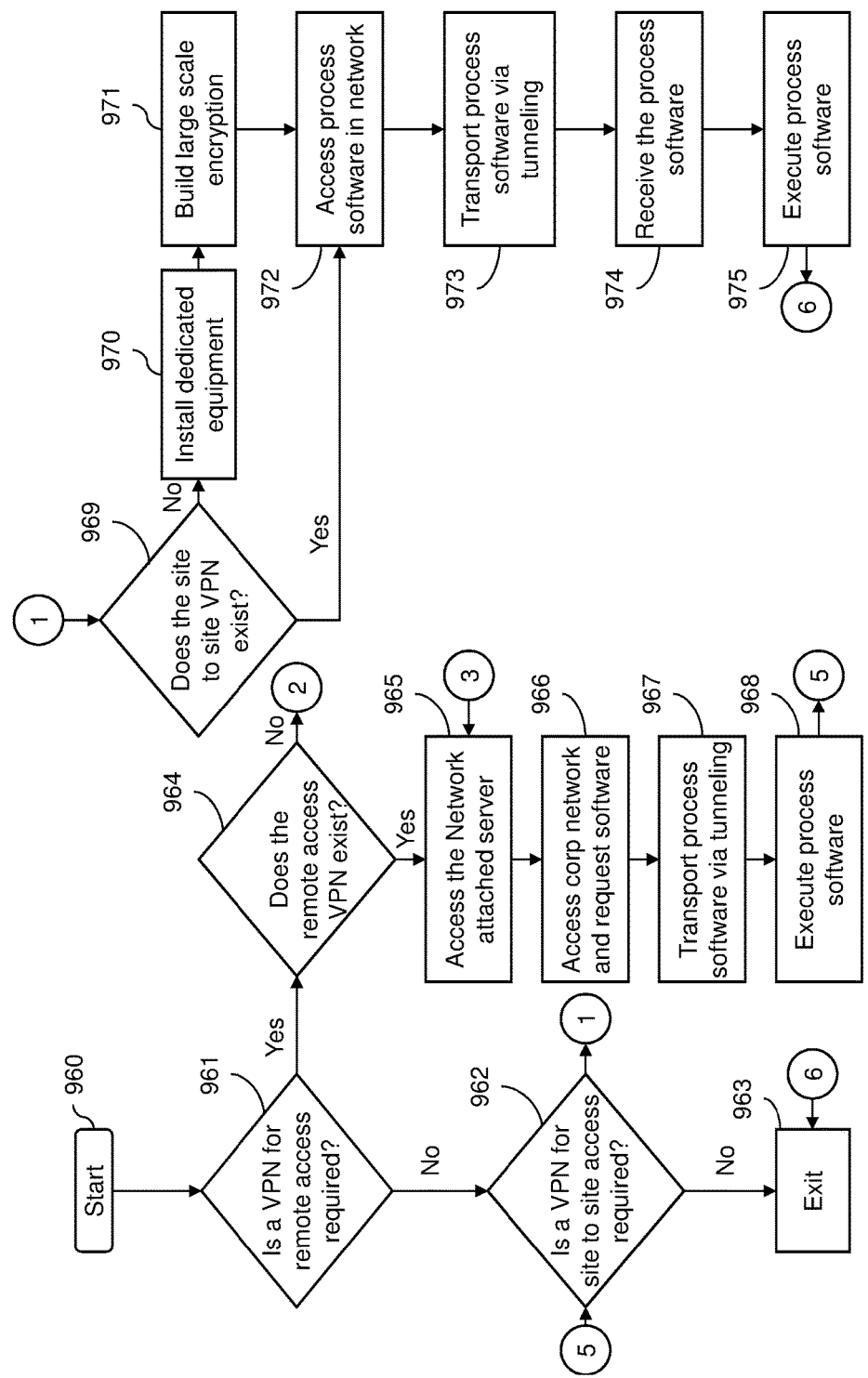
FIG. 10 is a schematic diagram of a virtual private network system according to systems and methods herein.
Figure 11:
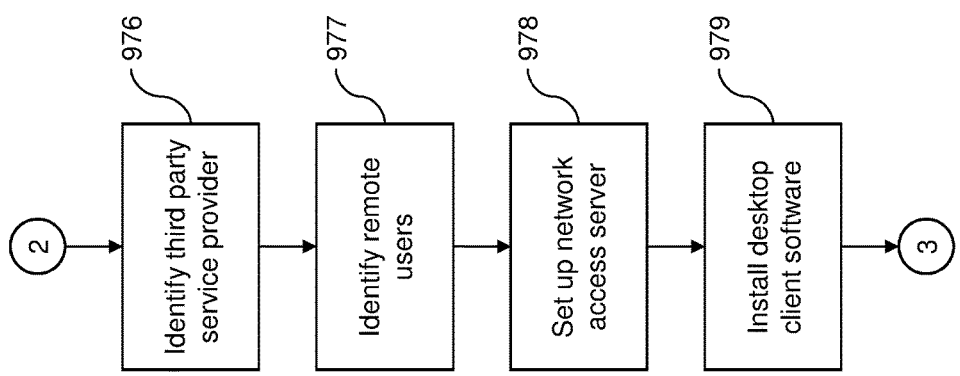
FIG. 11 is a schematic diagram of a virtual private network system according to systems and methods herein.

In FIGS. 10 and 11, step 960 begins the Virtual Private Network (VPN) process. A determination is made to see if a VPN for remote access is required 961. If it is not required, then proceed to 962. If it is required, then determine if the remote access VPN exists 964.

If it does exist, then proceed to 965. Otherwise, identify the third party provider that will provide the secure, encrypted connections between the company's private network and the company's remote users 976. The company's remote users are identified 977. The third party provider then sets up a network access server (NAS) 978 that allows the remote users to dial a toll-free number or attach directly via a cable or DSL modem to access, download, and install the desktop client software for the remote-access VPN 979.

After the remote access VPN has been built, or if it been previously installed, the remote users can then access the process software by dialing into the NAS or attaching directly via a cable or DSL modem into the NAS 965. This allows entry into the corporate network where the process software is accessed 966. The process software is transported to the remote users' desktop over the network via tunneling. That is, the process software is divided into packets and each packet, including the data and protocol, is placed within another packet 967. When the process software arrives at the remote users' desktop, it is removed from the packets, reconstituted, and executed on the remote users' desktop 968.

A determination is made to see if a VPN for site-to-site access is required 962. If it is not required, then proceed to exit the process 963. Otherwise, determine if the site-to-site VPN exists 969. If it does exist, then proceed to 972. Otherwise, install the dedicated equipment required to establish a site-to-site VPN 970. Then build the large-scale encryption into the VPN 971.

After the site-to-site VPN has been built, or if it had been previously established, the users access the process software via the VPN 972. The process software is transported to the site users over the network via tunneling 973. That is, the process software is divided into packets and each packet, including the data and protocol, is placed within another packet 974. When the process software arrives at the remote users' desktop, it is removed from the packets, reconstituted, and executed on the site users' desktop 975. Proceed to exit the process 963.

The terminology used herein is for the purpose of describing particular examples of the disclosed structures and methods and is not intended to be limiting of this disclosure. For example, as used herein, the singular forms "a", "an", and "the" are intended to include the plural forms as well, unless the context clearly indicates otherwise. Additionally, as used herein, the terms "comprises," "comprising," and/or "including," when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various systems and methods herein have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

What is claimed is:

1. A method comprising:

receiving a question into a computerized device;

determining a lexical answer type associated with said question, using said computerized device;

identifying candidate answers to said question, using said computerized device;

using a first plurality of first type coercion components of said computerized device, determining preliminary types for each of said candidate answers, each first type coercion component of said first plurality of first type coercion components using different resources and different processes to determine a preliminary type for each of said candidate answers;

comparing said preliminary types for each of said candidate answers to said lexical answer type associated with said question and producing a plurality of first type-scores for each of said candidate answers, using said first plurality of first type coercion components of said computerized device, each first type coercion component of said first plurality of first type coercion components producing a first type-score for each of said candidate answers, each first type-score of said plurality of first type-scores representing the degree of match between said preliminary types for each of said candidate answers and said lexical answer type associated with said question based on different methods particular to each first type coercion component of said first plurality of first type coercion components, each said first type-score of said plurality of first type-scores being differentiated based on which first type coercion component of said first plurality of first type coercion components produced said first type-score;

inputting said preliminary types for each of said candidate answers from each first type coercion component of said first plurality of first type coercion components and each first type-score of said plurality of first type-scores from each first type coercion component of said first plurality of first type coercion components into second type coercion components of a second plurality of second type coercion components of said computerized device;

evaluating said preliminary types for each of said candidate answers from each first type coercion component of said first plurality of first type coercion components and each first type-score of said plurality of first type-scores from each first type coercion component of said first plurality of first type coercion components using each second type coercion component of said second plurality of second type coercion components and producing a plurality of second scores using said second plurality of second type coercion components of said computerized device, each second type coercion component of said second plurality of second type coercion components separately determining a type for each of said candidate answers and producing a separate measure of the degree of match between said type for each of said candidate answers and said lexical answer type associated with said question, each second type coercion component of said second plurality of second type coercion components evaluating each said preliminary type, each said first type-score from each first type coercion component of said first plurality of first type coercion components, and the separate measure of the degree of match between said type for each of said candidate answers and said lexical answer type associated with said question, each second score of said plurality of second scores representing a combination of said first type-scores from each first type coercion component of said first plurality of first type coercion components and the separate measure of the degree of match between said type for each of said candidate answers and said lexical answer type associated with said question determined by each second type coercion component of said second plurality of second type coercion components based on different methods particular to each second type coercion component of said second plurality of second type coercion components;

inputting said second scores for each of said candidate answers from each second type coercion component of said second plurality of second type coercion components of said computerized device into a classifier of said computerized device;

calculating a final score based on said second scores for each of said candidate answers by aggregating the second score from each second type coercion component of said second plurality of second type coercion components, using said classifier of said computerized device; and outputting said final score representing a degree of confidence that each of said candidate answers is a type that matches said lexical answer type associated with said question, using said computerized device.

2. The method according to claim 1, further comprising: performing automated query analysis to determine said lexical answer type associated with said question, using said computerized device.

3. The method according to claim 1, further comprising:

matching said candidate answers against instances in a corpus of data, using said computerized device;

retrieving preliminary types from said corpus of data, using said computerized device, said preliminary types being associated with said instances;

matching said lexical answer type associated with said question with said preliminary types retrieved from said corpus of data, using said computerized device; and producing scores representing a degree of match between said lexical answer type associated with said question and said preliminary types for said candidate answers, using said computerized device.

4. The method according to claim 1, said producing first type-scores comprising using said first type coercion components of said computerized device, each of said first type coercion components having different resource-specific type classification methodologies determining preliminary types for each of said candidate answers and scoring a measure of degree that said preliminary types match said lexical answer type associated with said question, each of said first type coercion components producing a preliminary type and a first type-score.

5. The method according to claim 1, said producing second scores comprising using said second type coercion components of said computerized device, each of said second type coercion components having different resource-specific type classification methodologies determining types for each of said candidate answers and scoring a measure of degree that said types match said lexical answer type associated with said question, each of said second type coercion components producing a second score.

6. The method according to claim 1, said calculating a final score based on said second scores comprising using an aggregation function resolving said second scores from each second type coercion component of said second plurality of second type coercion components to a single final score, using said computerized device.

7. The method according to claim 1, further comprising determining whether any of said preliminary types are subtypes of said lexical answer type associated with said question, using said computerized device.

8. A method comprising:
identifying a question lexical answer type (LAT) for a question in a question-answering system, using a computerized device;
generating candidate answers to said question, using said computerized device;
determining preliminary types for each of said candidate answers using different resources of said computerized device to produce said preliminary types, each of said different resources using different processes to determine a preliminary type for each of said candidate answers;
comparing said preliminary types for each of said candidate answers to said question LAT and scoring a match between said preliminary types and said question LAT using a first plurality of first type coercion components of said computerized device, each first type coercion component of said first plurality of first type coercion components producing a first type-score representing the degree of match between said preliminary types and said question LAT, each first type coercion component of said first plurality of first type coercion components using different resources to produce said first type-score, and said scoring being differentiated based on which first type coercion component of said first plurality of first type coercion components produced a given preliminary type;
evaluating each said preliminary type and each said first type-score from each first type coercion component of said first plurality of first type coercion components, using a second plurality of second type coercion components of said computerized device, each second type coercion component of said second plurality of second type coercion components producing a second score for said preliminary type for said candidate answer based on a combination of said first type-score and a separate determination of type for each of said candidate answers and measure of degree that said type matches said question LAT, each second type coercion component of said second plurality of second type coercion components using different resources to produce said second score, and said scoring being differentiated based on which second type coercion component of said second plurality of second type coercion components produced a given type; and
outputting a final score by aggregating said second score from each second type coercion component of said second plurality of second type coercion components, said final score representing a degree of confidence that said candidate answer is a type that matches said question LAT, using said computerized device.

9. The method according to claim 8, further comprising:
receiving a question into said computerized device; and
performing automated query analysis to determine said question LAT, using said computerized device.

10. The method according to claim 8, said question-answering system further comprising a corpus of data, said method further comprising:
generating said candidate answers for said question from said corpus of data, using said computerized device.

11. The method according to claim 10, said scoring further comprising:
matching said candidate answers against instances in said corpus of data, using said computerized device;
retrieving preliminary types from said corpus of data, using said computerized device, said preliminary types being associated with said instances;
matching said question LAT with said preliminary types retrieved from said corpus of data, using said computerized device; and
producing scores representing a degree of match between said question LAT and said preliminary types for said candidate answer, using said computerized device.

12. The method according to claim 8, said first type coercion components having different resource-specific type classification methodologies determining preliminary types for each of said candidate answers and scoring said measure of degree that said preliminary types match said question LAT.

13. The method of claim 8, said second type coercion components having different resource-specific type classification methodologies determining types for each of said candidate answers and scoring said measure of degree that said types match said question LAT.

14. A computer program product for determining a confidence score for candidate answers to questions in a question-answering system, said computer program product comprising a non-transitory computer readable storage medium having program code embodied therewith, said program code being readable and executable by a computer to perform a method comprising:
receiving a question into a computerized device;
determining a question lexical answer type (LAT) associated with said question;
identifying candidate answers to said question;
using a first plurality of first type coercion components, determining preliminary types for each of said candidate answers, each first type coercion component of said first plurality of first type coercion components using different resources and different processes to determine a preliminary type for each of said candidate answers;

producing first type-scores representing the degree of match between said preliminary types and said question LAT, using said first plurality of first type coercion components, each first type coercion component of said first plurality of first type coercion components producing a first type-score for each of said candidate answers;

using a second plurality of second type coercion components, separately determining types for each of said candidate answers, each second type coercion component of said second plurality of second type coercion components determining a type for each of said candidate answers based on different methods particular to each second type coercion component of said second plurality of second type coercion components;

producing second scores representing a combination of said first type-scores from each first type coercion component of said first plurality of first type coercion components and a separate measure of the degree of match between said types and said question LAT, using said second plurality of second type coercion components, said second scores being based on different methods particular to each second type coercion component of said second plurality of second type coercion components;

calculating a final score based on said second scores for each of said candidate answers by aggregating the second score from each second type coercion component of said second plurality of second type coercion components; and outputting said final score representing a degree of confidence that said candidate answer is a type that matches said question LAT.

15. The computer program product according to claim 14, said method further comprising:

performing automated query analysis to determine said question LAT.

16. The computer program product according to claim 14, said method further comprising:

matching said candidate answer against instances in a corpus of data;

retrieving preliminary types from said corpus of data, said preliminary types being associated with said instances;

matching said question LAT with said preliminary types retrieved from said corpus of data; and producing scores representing a degree of match between said question LAT and said preliminary types for said candidate answers.

17. The computer program product according to claim 14, said producing first type-scores comprising using said first type coercion components, each of said first type coercion components having different resource-specific type classification methodologies determining preliminary types for each of said candidate answers and scoring a measure of degree that said preliminary types match said question LAT, each of said first type coercion components producing a preliminary type and a first type-score.

18. The computer program product according to claim 14, said producing second scores comprising using said second type coercion components, each of said second type coercion components having different resource-specific type classification methodologies determining types for each of said candidate answers and scoring a measure of degree that said types match said question LAT, each of said second type coercion components producing a second score.

19. The computer program product according to claim 14, said calculating a final score based on said second scores comprising using an aggregation function resolving said second scores from each second type coercion component of said second plurality of second type coercion components to a single final score.

20. The computer program product according to claim 14, further comprising determining whether any of said preliminary types are subtypes of said question LAT.

* * * * *